US012320280B1

(12) United States Patent
Koo

(10) Patent No.: US 12,320,280 B1
(45) Date of Patent: Jun. 3, 2025

(54) APPARATUS AND METHOD OF DIAGNOSING A BLOW-BY GAS RECIRCULATION SYSTEM

(71) Applicants: HYUNDAI MOTOR COMPANY, Seoul (KR); KIA CORPORATION, Seoul (KR)

(72) Inventor: Bon Chang Koo, Seongnam-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 0 days.

(21) Appl. No.: 18/643,304

(22) Filed: Apr. 23, 2024

(30) Foreign Application Priority Data

Dec. 4, 2023 (KR) ........................ 10-2023-0173102

(51) Int. Cl.

| | |
|---|---|
| ***F01M 11/10*** | (2006.01) |
| ***F01M 13/00*** | (2006.01) |
| ***F01M 13/02*** | (2006.01) |
| ***F02B 37/18*** | (2006.01) |
| ***F02D 41/00*** | (2006.01) |

(52) U.S. Cl.

CPC ......... *F01M 11/10* (2013.01); *F01M 13/0011* (2013.01); *F01M 13/022* (2013.01); *F02B 37/18* (2013.01); *F02D 41/0007* (2013.01); *F01M 2013/0038* (2013.01); *F01M 2013/0077* (2013.01); *F01M 2013/027* (2013.01); *F01M 2250/60* (2013.01); *F02D 2200/024* (2013.01); *F02D 2200/04* (2013.01); *F02D 2200/602* (2013.01); *F02D 2200/703* (2013.01)

(58) Field of Classification Search

CPC .. F01M 11/10; F01M 13/0011; F01M 13/022; F01M 2013/0038; F01M 2013/0077; F01M 2013/027; F01M 2250/60; F02B 37/18; F02D 41/0007; F02D 2200/024; F02D 2200/04; F02D 2200/602; F02D 2200/703

See application file for complete search history.

(56) References Cited

U.S. PATENT DOCUMENTS

2021/0180485 A1* 6/2021 Koo .................. F01M 13/0011

* cited by examiner

*Primary Examiner* — Brandon D Lee

(74) *Attorney, Agent, or Firm* — Lempia Summerfield Katz LLC

(57) ABSTRACT

An apparatus of diagnosing a blow-by gas recirculation system includes: a head portion of an engine forming a combustion chamber, a head cover provided above the head portion, a crankcase formed below the combustion chamber, an intake line through which intake air flows into the combustion chamber, a breather hose connecting the crankcase and the intake line upstream of a compressor mounted on the intake line, a PCV hose connecting the crankcase and a surge tank, and a controller. The controller is configured to preliminarily determine whether the breather hose is abnormal based on atmospheric pressure, a crankcase model pressure determined from an intake air flow rate flowing in through a throttle valve, and a crankcase internal pressure. The controller is configured to form negative pressure in the crankcase when it is preliminarily determined that the breather hose is abnormal, and finally determine whether the breather hose is abnormal.

17 Claims, 8 Drawing Sheets

FIG. 4

| | | | | | | | | | |
|---|---|---|---|---|---|---|---|---|---|
| SMALL ENGINE | X | 0 | 50 | 100 | 200 | 300 | 400 | 500 | 600 |
| | Z | 0 | 1.71875 | 3.984375 | 11.875 | 24.375 | 41.484375 | 63.203125 | 104.375 |

FIG. 5

| LARGE ENGINE | | | | | | | | | |
|---|---|---|---|---|---|---|---|---|---|
| | X | 0 | 200 | 400 | 600 | 800 | 1000 | 1200 | 1500 |
| | Z | 0 | 5 | 25 | 45 | 70 | 100 | 130 | 200 |

APPARATUS AND METHOD OF DIAGNOSING A BLOW-BY GAS RECIRCULATION SYSTEM

CROSS-REFERENCE TO RELATED APPLICATION

This application claims priority to and the benefit of Korean Patent Application No. 10-2023-0173102, filed in the Korean Intellectual Property Office on Dec. 4, 2023, the entire contents of which are incorporated herein by reference.

BACKGROUND

(a) Field

The disclosure relates to an apparatus and method of diagnosing a blow-by gas recirculation system.

(b) Description of the Related Art

Generally, an internal combustion engine used as a power source in vehicles, etc. includes a combustion chamber having a predetermined volume, a piston reciprocating up and down inside the combustion chamber, a crank mechanism converting the reciprocating motion of the piston into rotational motion, a head cover (or a rocker cover) mounted in an upper portion of the combustion chamber, and an oil pan mounted in a lower portion of the combustion chamber to accommodate lubricating oil.

The internal combustion engine introduces fuel and air into the combustion chamber, compresses and explodes a mixture of fuel and air, thereby causing the piston to reciprocate, and the reciprocating motion of the piston is converted into rotational motion through a crank mechanism to provide power necessary to drive vehicles.

During the operation of an internal combustion engine, a portion of unburned gas occurring during a compression stroke and a portion of burned gas occurring during an expansion stroke may leak into the head cover, a crankcase, or the oil pan, and a leaked blow-by gas may deteriorate a lubricant stored in the oil pan or corrode the inside of the internal combustion engine.

In addition, releasing the blow-by gas from the internal combustion engine into the atmosphere may cause air pollution, and thus, a blow-by gas recirculation system that returns the blow-by gas to the combustion chamber of the internal combustion engine for re-combustion has been used.

In the conventional blow-by gas recirculation system, a breather hose connected to the head cover through a nipple is installed in the middle of an elbow hose at a downstream (or at a rear end) of an air cleaner, and when the engine is run, blow-by gas is supplied to the head cover by using a pressure difference with fresh air flowing in from the outside.

However, while vehicles are running, the breather hose mounted through the nipple may be released from the head cover due to various reasons. In order to detect the phenomenon of the breather hose being released, in the related art, a method of comparing internal pressure of the crankcase with a reference value for failure diagnosis was used, but the related art method resulted in many misdiagnoses.

The above information disclosed in this Background section is provided only to enhance understanding of the background of the present disclosure and therefore it may contain information that does not form the prior art that is already known to a person of ordinary skill in the art.

SUMMARY

The present disclosure provides an apparatus of diagnosing blow-by gas recirculation system and a method thereof, which are capable of accurately determining whether a breather hose is abnormal in a blow-by gas recirculation system.

According to an embodiment, an apparatus of diagnosing a blow-by gas recirculation system includes: a head portion of an engine that forms a combustion chamber; a head cover provided above the head portion; a crankcase formed below the combustion chamber; an intake line through which intake air flows into the combustion chamber; a breather hose connecting the crankcase and the intake line upstream of a compressor mounted on the intake line; a positive crankcase ventilation (PCV) hose connecting the crankcase and a surge tank; and a controller configured to preliminarily determine whether the breather hose is abnormal based on atmospheric pressure, a crankcase model pressure that is determined from an intake air flow rate flowing in through a throttle valve, and a crankcase internal pressure measured by a pressure sensor configured to measure the crankcase internal pressure. The controller is configured to form negative pressure in the crankcase when it is preliminarily determined that the breather hose is abnormal, and finally determine whether the breather hose is abnormal.

In some embodiments, the controller may accumulate the crankcase model pressure at every set period by a set number of times to calculate an accumulated model pressure, accumulate the crankcase internal pressure measured by the pressure sensor to calculate an accumulated measured pressure, and calculate a ratio of the accumulated model pressure and the accumulated measured pressure to preliminarily determine whether the breather hose is abnormal.

In some embodiments, the controller may preliminarily determine that the breather hose is abnormal when the ratio of the accumulated model pressure and the accumulated measured value is less than the set ratio.

In some embodiments, the controller may form negative pressure in the crankcase by blocking the throttle valve and blocking a waste gate valve, and accumulate the crankcase model pressure at every set period by the set number of times to calculate the accumulated model pressure, accumulate the crankcase internal pressure measured by the pressure sensor to calculate the accumulated measured pressure, and calculate the ratio of the accumulated model pressure and the accumulated measured pressure to determine whether the breather hose is abnormal.

In some embodiments, the controller may make a final determination on an abnormality of the breather hose when the ratio of the accumulated model pressure and the accumulated measured value is less than the set ratio.

In some embodiments, the controller may block the throttle valve and the waste gate valve to form negative pressure in the crankcase only when boosting pressure by the compressor is equal to or greater than a set pressure and an open value of an accelerator pedal sensor is equal to or greater than a set value.

In some embodiments, the crankcase model pressure may be determined by a difference between atmospheric pressure and a pressure loss value due to an air cleaner determined from the intake air flow rate of air flowing into the engine.

In some embodiments, a pressure loss value, which is caused by the air cleaner, is associated with the intake air flow rate, and the pressure value(s) may be stored in advance in the controller in a map data format.

According to an embodiment, a method of diagnosing a blow-by gas recirculation system includes: measuring, by a sensing unit, atmospheric pressure and an intake air flow rate of air flowing into an engine; calculating, by a controller, a crankcase model pressure based on the atmospheric pressure and a pressure loss associated with the intake air flow rate; preliminarily determining, by the controller, whether a breather hose of the engine is abnormal based on a crankcase internal pressure and a crankcase model pressure; and forming, by the controller, negative pressure in a crankcase of the engine when it is preliminarily determined that the breather hose is abnormal. The method further includes: calculating, by the controller, the crankcase model pressure based on the atmospheric pressure and the pressure loss associated with the intake air flow rate; and finally determining, by the controller, whether the breather hose is abnormal based on the crankcase internal pressure and the crankcase model pressure.

In some embodiments, the crankcase model pressure may be determined by a difference between atmospheric pressure and a pressure loss value due to the air cleaner determined from the intake air flow rate.

In some embodiments, the pressure loss of the air cleaner over the intake air flow rate may be stored in advance in the controller in a map data format.

In some embodiments, the preliminarily determining may include: accumulating the crankcase model pressure at every set period by a set number of times to calculate an accumulated model pressure; accumulating the crankcase internal pressure at every set period by a set number of times to calculate an accumulated measured pressure; and calculating a ratio of the accumulated model pressure and the accumulated measured pressure to diagnose whether the breather hose is abnormal.

In some embodiments, it may be preliminarily determined that the breather hose is abnormal when the ratio of the accumulated model pressure and the accumulated measured value is less than the set ratio.

In some embodiments, the finally determining may include: accumulating the crankcase model pressure at every set period by a set number of times to calculate an accumulated model pressure; accumulating the crankcase internal pressure at every set period by a set number of times to calculate an accumulated measured pressure; and calculating a ratio of the accumulated model pressure and the accumulated measured pressure to diagnose whether the breather hose is abnormal.

In some embodiments, it may be finally determined that the breather hose is abnormal when the ratio of the accumulated model pressure and the accumulated measured value is less than the set ratio.

In some embodiments, the forming of the negative pressure may be performed only when a boosting pressure by the compressor is equal to or greater than a set pressure and an open value of an accelerator pedal sensor is equal to or greater than a set value.

In some embodiments, whether the breather hose is abnormal may be diagnosed only when pressure of the compressor is equal to or higher than a set pressure and an open value of a throttle valve is equal to or greater than a set value.

According to embodiments, the crankcase model pressure is calculated from a difference between atmospheric pressure and a pressure loss caused by the air filter of the air cleaner, and whether the breather hose is abnormal may be clearly determined based on the crankcase model pressure and the crankcase internal pressure measured by the crankcase pressure sensor.

In addition, even when the difference between the crankcase internal pressure in a normal state and the internal pressure of the crankcase when the breather hose is abnormal is small, whether the breather hose is abnormal may be accurately determined.

Other effects that may be obtained or expected from the embodiments of the present disclosure are explicitly or implicitly disclosed by the detailed description of the embodiments of the disclosure. In other words, various effects expected from the embodiments of the disclosure are disclosed in the following description.

BRIEF DESCRIPTION OF THE DRAWINGS

The drawings are used to be referred to in describing embodiments of the disclosure, so a technical concept of the disclosure should not be meant to restrict the disclosure to the accompanying drawings.

FIGS. 4 and 5 are tables illustrating pressure loss caused by an air cleaner over an intake air flow rate according to an embodiment of the present disclosure.

Figure 1:
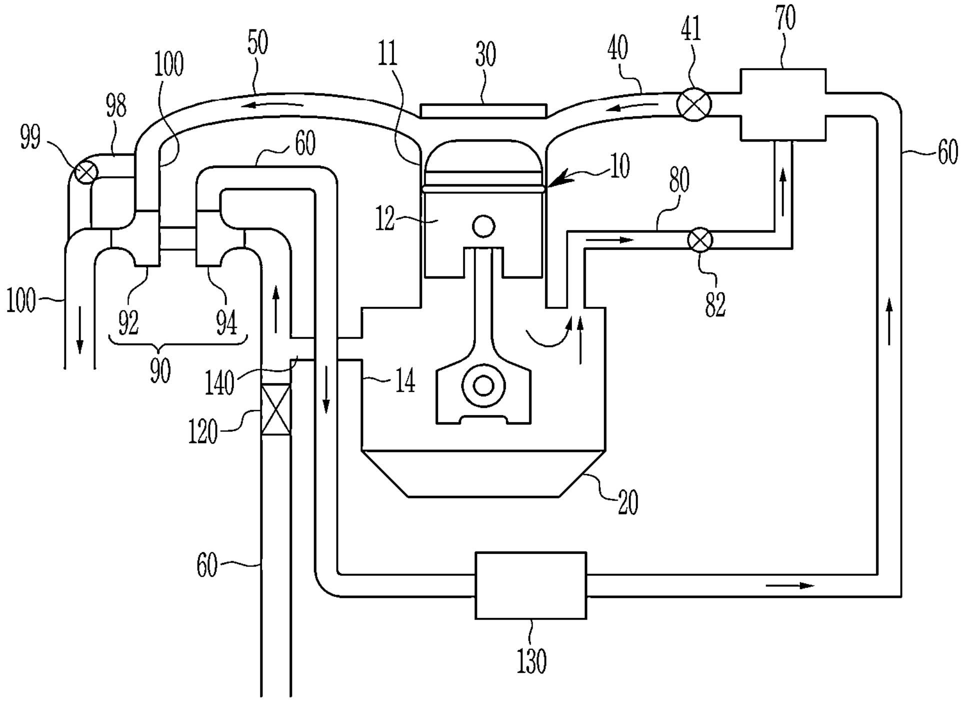
FIG. 1 is a conceptual diagram illustrating a configuration of a blow-by gas recirculation system according to an embodiment.

It is to be understood that the drawings referenced above are not necessarily drawn to scale, but rather present a rather simplified representation of various features illustrating the basic principles of the disclosure. Certain design features of the disclosure, including, for example, particular dimensions, orientation, location, and shape, should be determined in portion by the particular intended application and environment of use.

DETAILED DESCRIPTION

The terminology used herein is for the purpose of describing specific embodiments only and is not intended to limit the present disclosure. As used herein, the singular forms are intended to include the plural forms as well, unless the context clearly indicates otherwise. The terms "comprise" and/or "comprising", when used herein, specify the presence of recited features, integers, levels, operations, components and/or components, but it should also be understood that does not exclude the presence or addition of one or more of the features, integers, levels, acts, elements, components and/or groups thereof. As used herein, the term "and/or" includes any one or all combinations of the associated listed items.

When a component, device, element, or the like of the present disclosure is described as having a purpose or performing an operation, function, or the like, the component, device, or element should be considered herein as being "configured to" meet that purpose or to perform that operation or function.

In addition, it is understood that one or more of the methods below or aspects thereof are executed by at least one controller. The term "controller" may refer to a hardware device that includes a memory and a processor. The memory is configured to store program instructions and the processor is specially programmed to execute the program instructions to perform one or more processes described in more detail below. The controller, as described herein, may control the operation of units, modules, components, devices, or the like. It is also understood that the methods below may be practiced by an apparatus that includes a controller along with one or more other components, as recognized by a person of ordinary skill in the art.

In addition, the controller of the disclosure may be implemented as a non-transitory computer-readable recording medium including executable program instructions executed by a processor. Examples of the computer-readable recording medium include ROM, RAM, compact disk, ROM, magnetic tapes, floppy disks, flash drives, smart cards, and optical data storage devices, but are not limited thereto. The computer-readable recording medium may also be distributed throughout a computer network to store and execute program instructions in a distributed manner, such as, for example, a telematics server or a controller area network (CAN).

Some embodiments of the present disclosure are described in detail with reference to the accompanying drawings to allow those having ordinary skill in the art to easily practice the disclosure. However, the present disclosure may be implemented in various different forms and is not limited to the embodiments as described herein.

Portions unrelated to the description may be omitted in order to more clearly describe the present disclosure, and the same or similar components may be denoted by the same reference numerals throughout the present specification.

The size and thickness of each component shown in the drawings may be arbitrarily shown for convenience of explanation, and therefore, the disclosure is not necessarily limited to the shown embodiments in the drawings, and the thickness of various portions and regions are enlarged for clarity.

In addition, terms "module" and/or "portion" for components used in the present specification are used only in order to easily make the specification. Therefore, these terms do not have meanings or roles that are distinguished from each other.

In describing the embodiments, when a detailed description of the relevant known function or configuration is determined to unnecessarily obscure the important point of the present disclosure, the detailed description has been omitted.

The accompanying drawings of the present disclosure aim to facilitate understanding of the disclosure and should not be construed as limited to the accompanying drawings. Also, the present disclosure is not limited to a specific disclosed form but includes all modifications, equivalents, and substitutions without departing from the scope and spirit of the present disclosure.

In the flowchart described with reference to the drawings in this specification, the order of operations may be changed, several operations may be merged, a certain operation may be divided, and a specific operation may not be performed.

Hereinafter, an apparatus of diagnosing a blow-by gas recirculation system according to the present disclosure is described in detail with reference to the accompanying drawings.

FIG. 1 is a conceptual diagram illustrating a configuration of a blow-by gas recirculation system according to an embodiment of the present disclosure. Also, FIG. 2 is a block diagram illustrating a configuration of an apparatus of diagnosing a blow-by gas recirculation system according to an embodiment of the present disclosure.

Figure 2:
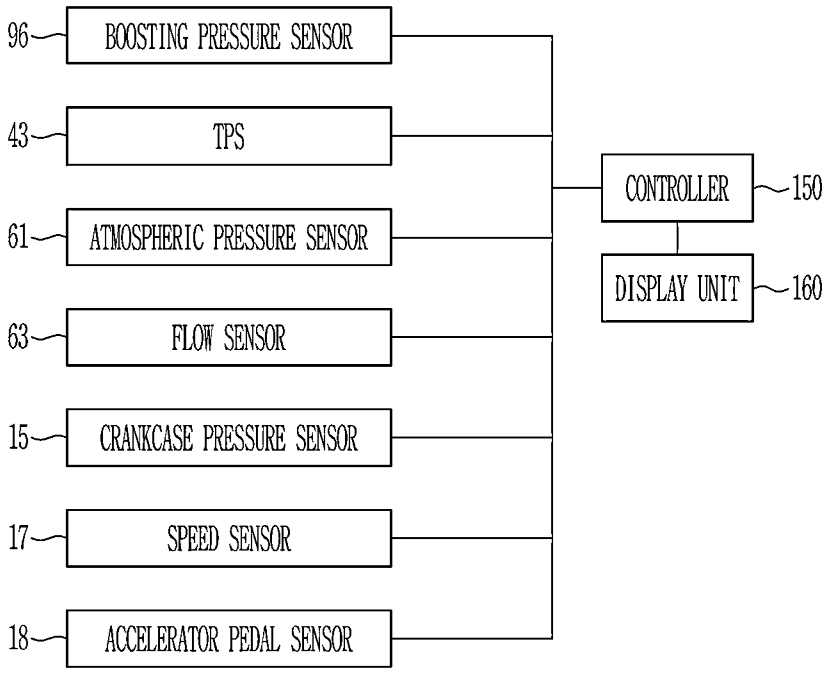
FIG. 2 is a block diagram illustrating a configuration of an apparatus of diagnosing a blow-by gas recirculation system according to an embodiment.

As shown in FIGS. 1 and 2, the blow-by gas recirculation system according to the present disclosure is applied to an engine and the engine includes a head portion 11 forming at least one combustion chamber 10.

A crankcase 14 in which a crank mechanism is accommodated and an oil pan 20 accommodating lubricating oil are provided below the head portion 11 forming the combustion chamber 10. A head cover 30 (or a locker cover) is mounted above the head portion 11 forming the combustion chamber 10.

An intake manifold 40 that supplies external air to a plurality of combustion chambers and an exhaust manifold 50 that discharges exhaust gas generated in the combustion chamber are connected to the combustion chamber 10.

An intake line 60 is connected to the intake manifold 40. Intake air flowing from the outside and supplied to the combustion chamber flows through the intake line 60, and a surge tank 70 is installed in the intake line 60. An air cleaner 120 including an air filter for filtering air flowing in from the outside is installed in the intake line 60, and a throttle valve 41 for adjusting an intake air flow rate supplied to the combustion chamber through the intake line 60 is installed in the intake manifold 40.

Each exhaust manifold 50 is connected to the exhaust line 100 for discharging exhaust gas generated in the combustion chamber to the outside.

A piston 12 that reciprocates up and down is installed inside the combustion chamber 10, and a mixture of fuel and air flowing into the combustion chamber 10 is compressed and expanded by the piston 12 to generate power necessary for driving a vehicle.

An engine to which the blow-by recirculation system according to the disclosure is applied is equipped with a turbocharger 90 for compressing intake air flowing in from the outside.

The turbocharger 90 may include a turbine 92 installed in the exhaust line 100 and operated by exhaust gas and a compressor 94 installed in the intake line 60 and interworking with the turbine 92 to compress intake air flowing in from the outside.

The turbocharger 90 includes a waste gate valve 99 that controls the amount of exhaust gas discharged from each combustion chamber and supplied to the turbine 92.

The waste gate valve 99 is provided in the exhaust bypass line 98 that branches off from the exhaust line 100 upstream of the turbine 92 and joins the exhaust line 100 downstream of the turbine 92. An amount of exhaust gas supplied to the turbine 92 is adjusted by adjusting an open value of the waste gate valve 99.

An intercooler 130 is installed in the intake line 60 downstream of the compressor 94 to cool high-temperature, high-pressure intake air compressed by the compressor 94.

The blow-by recirculation system according to the disclosure may include a breather hose 140, a positive crankcase ventilation (PCV) hose, and a PCV valve 82 to recirculate blow-by gas leaked from the combustion chamber 10 into the combustion chamber 10.

The breather hose 140 connects the intake line 60 and the crankcase 14. At this time, the breather hose 140 branches off from the intake line 60 upstream of the compressor 94 and connects the crankcase 14.

The PCV hose 80 connects the crankcase 14 and the surge tank 70, and the PCV valve 82 is mounted on the PCV hose 80. The PCV valve 82 is provided to supply blow-by gas flowing into the crankcase when the engine is run to the combustion chamber 10 of the engine. The operation and configuration of the PCV valve 82 are known in the art to which the disclosure pertains, so detailed description thereof is omitted.

In an embodiment, an apparatus of diagnosing a blow-by gas recirculation system may include a sensing unit that measures atmospheric pressure, an intake air flow rate, an open value of the throttle valve 41, intake pressure boosted by the compressor 94, internal pressure of the crankcase 14, an open value (or a position) of the waste gate valve 99, and an open value of an accelerator pedal.

To this end, the sensing unit may include an atmospheric pressure sensor 61 that measures atmospheric pressure, a flow sensor 63 that measures an intake air flow rate flowing into the combustion chamber according to the open value of the throttle valve 41, a throttle position sensor (TPS) 43 that measures an open value of the throttle valve 41, a boosting pressure sensor 96 that measures intake pressure boosted by the compressor 94, a crankcase pressure sensor 15 that measures internal pressure of the crankcase 14, a speed sensor 17 that measures an engine speed, and an accelerator pedal sensor (APS) that measures an open value of the accelerator pedal.

In one form, the crankcase pressure sensor 15 may be a differential pressure sensor that measures a difference between atmospheric pressure and internal pressure of the crankcase 14. In this case, the atmospheric pressure sensor 61 may not be used.

The atmospheric pressure measured by the atmospheric pressure sensor 61, the intake air flow rate measured by the flow sensor 63, the open value of the throttle valve 41 measured by the throttle position sensor 43, the pressure of the crankcase measured by the crankcase pressure sensor 15, the engine speed measured by the speed sensor 17, and the open value of the accelerator pedal measured by the accelerator pedal sensor 18 are transmitted to a controller 150.

The controller 150 may preliminarily determine whether the breather hose 140 is abnormal based on atmospheric pressure, crankcase model pressure determined from an intake air flow rate flowing in to the combustion chamber through the throttle valve 41, and crankcase internal pressure measured by the crankcase pressure sensor 15. When it is preliminarily determined that the breather hose 140 is abnormal, the controller 150 may form negative pressure in the crankcase 14 and then finally determine whether the breather hose 140 is abnormal based on atmospheric pressure, the crankcase model pressure determined from the intake air flow rate flowing in to the combustion chamber through the throttle valve 41, and the crankcase internal pressure measured by the crankcase pressure sensor 15.

To this end, the controller 150 may be implemented to include one or more processors that operate according to a set program, and a memory of the controller may store program instructions programmed to perform each operation of a control method of a vehicle provided with a motor according to the disclosure through one or more processors.

In addition, the blow-by recirculation system according to an embodiment may include a display unit 160 that notifies a driver or the like that the breather hose 140 is abnormal.

The display unit 160 may be implemented as a center fascia or a display device provided in the vehicle.

Hereinafter, a method of diagnosing a blow-by gas recirculation system according to an embodiment is described in detail with reference to the accompanying drawings.

Figure 3A:
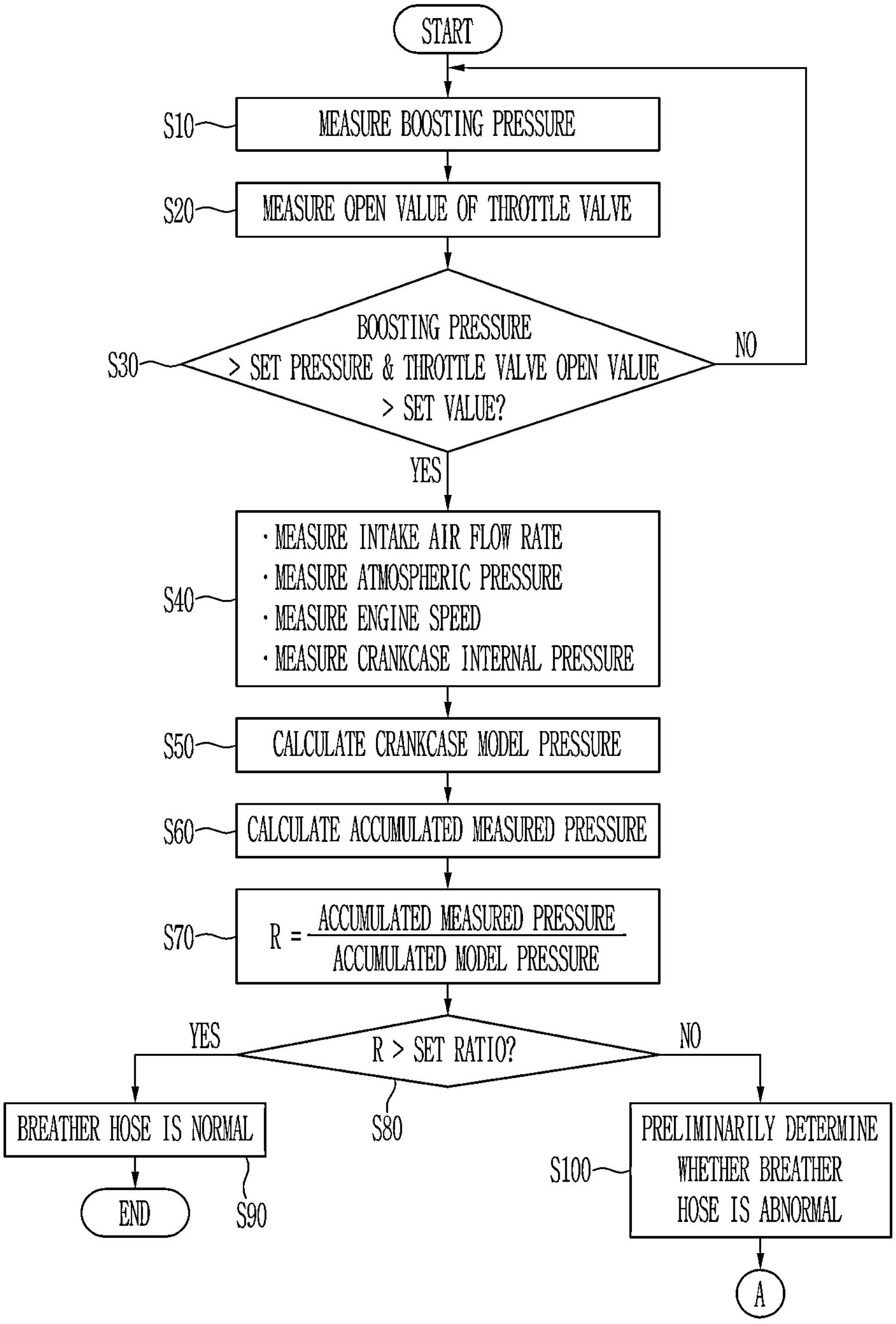
FIGS. 3A-3B are flowcharts illustrating a method of diagnosing a blow-by gas recirculation system according to an embodiment.
Figure 3B:
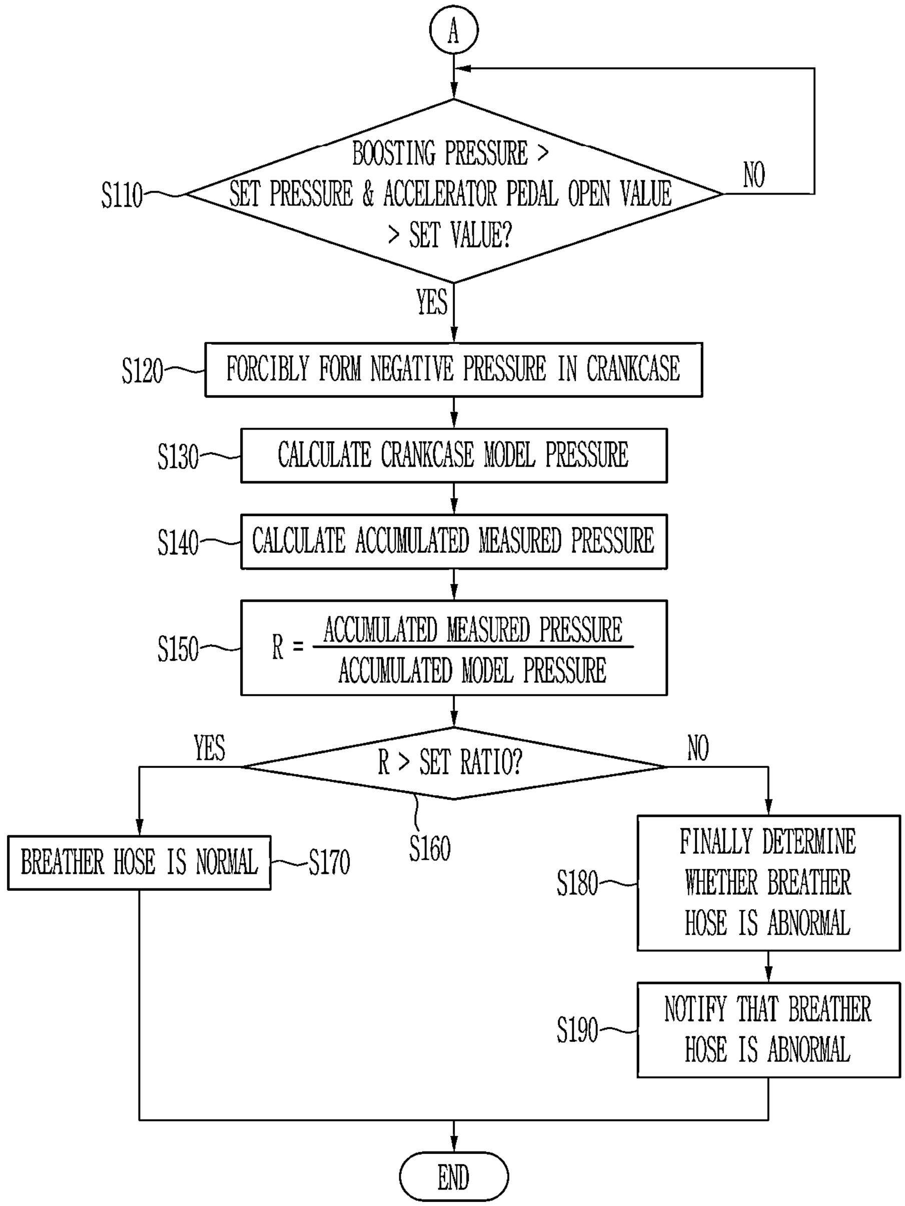

FIG. 3 is a flowchart illustrating a method of diagnosing a blow-by gas recirculation system according to an embodiment.

As shown in FIG. 3, while the vehicle is traveling, the boosting pressure sensor 96 measures a boosting pressure of intake air compressed by the compressor 94, and the boosting pressure of the intake air measured by the boosting pressure sensor 96 is transmitted to the controller 150 (an operation S10).

The throttle position sensor 43 measures an open value of the throttle valve 41, and the open value of the throttle valve 41 measured by the throttle position sensor 43 is transmitted to the controller 150 (an operation S20).

The controller 150 determines whether the measured boosting pressure is equal to or greater than a set pressure and whether the measured open value of the throttle valve 41 is equal to or greater than a set value (an operation S30).

In the operation S30, if the measured boosting pressure is less than the set pressure (e.g., 1,100 hPa) and the measured open value of the throttle valve 41 is less than the set value (e.g., 15%), an operation of diagnosing whether the breather hose 140 is abnormal is not performed. When the measured boosting pressure is less than the set pressure and the measured open value of the throttle valve 41 is less than the set value, a flow rate of the blow-by gas moving through the breather hose 140 and the PCV hose 80 is not sufficient, so it may be difficult to determine whether the breather hose 140 is abnormal. Thus, in this case, it is not determined whether the breather hose 140 is abnormal.

In the operation S30, if the measured boosting pressure is equal to or greater than the set pressure and the measured open value of the throttle valve 41 is equal to or greater than the set value, the atmospheric pressure sensor 61 measures the atmospheric pressure and the atmospheric pressure measured by the atmospheric pressure sensor 61 is transmitted to the controller 150 (an operation S40). The flow sensor 63 measures the intake air flow rate flowing into the intake line 60 according to the open value of the throttle valve 41, and the intake air flow rate measured by the flow sensor 63 is transmitted to the controller 150 (in the operation S40)). The speed sensor 17 measures an engine speed, and the engine speed measured by the speed sensor 17 is transmitted to the controller 150. The crankcase pressure sensor 15 measures internal pressure of the crankcase 14, and the internal pressure of the crankcase 14 measured by the crankcase pressure sensor 15 is transmitted to the controller 150 (in the operation S40).

The controller 150 calculates a crankcase model pressure based on the atmospheric pressure measured by the atmospheric pressure sensor 61 and the intake air flow rate measured by the flow sensor 63 (an operation S50). Also, the controller 150 accumulates the crankcase model pressure calculated at every set period and calculates an accumulated model pressure.

The crankcase model pressure is determined by a difference between the atmospheric pressure and a pressure loss caused by the air filter of the air cleaner 120. The pressure loss caused by the air filter is determined by an intake air flow rate. This may be expressed mathematically as follows:

$$\text{Crankcase model pressure} = \text{atmospheric pressure} - \text{pressure loss due to air filter.} \qquad \text{Equation 1}$$

Here, the pressure loss caused by the air filter according to the intake air flow rate is stored in advance in the controller 150 in a map table format as follows.

In the case of a small engine, the amount of pressure loss due to the air filter over the intake air flow rate may be determined as shown in the table in FIG. 4. Also, in the case of a large engine, the amount of pressure loss due to the air filter over the intake air flow rate may be determined as shown in the table in FIG. 5.

For example, in a small engine, if the atmospheric pressure measured by the atmospheric pressure sensor 61 is 102.3 kPa and the intake air flow rate measured by the flow sensor 63 is 50 kg/h, the pressure loss due to the air cleaner 120 is 1.71875 kPa (See FIG. 4). Therefore, the crankcase model pressure is 100.58125 kPa. Referring to FIGS. 4 and 5, X refers to intake air flow rate, and Z refers to pressure loss due to the air cleaner 120.

The controller 150 receives the crankcase internal pressure measured by the crankcase pressure sensor 15 at every set period (e.g., 1 second) and accumulates the crankcase internal pressure received at every set period by a set number of times (e.g., 1,000 times) to calculate accumulated measured pressure (an operation S60).

If the accumulated model pressure is equal to greater than the set value, the controller 150 calculates the ratio "R" between the accumulated model pressure and the accumulated internal pressure of the crankcase 14 (an operation S70).

If the ratio of the accumulated model pressure and the accumulated measured pressure is equal to or greater than the set ratio (e.g., 0.75) (an operation S80), the controller 150 may determine that the breather hose is normal (an operation S90).

Conversely, if the ratio of the accumulated model pressure and the accumulated measured pressure is less than the set ratio (e.g., 0.75) (in the operation S80), the controller 150 may preliminarily determine that the breather hose 140 is abnormal (e.g., the breather hose 140 is released or separated, etc.) (an operation S100).

As the pressure (atmospheric pressure) of intake air flowing in from the outside passes through the air filter of the air cleaner 120, a pressure loss (or pressure drop) occurs. A difference between the atmospheric pressure and the pressure loss due to the air filter is equal to the internal pressure of the crankcase 14, and a difference between the atmospheric pressure and the pressure loss due to the air filter becomes the crankcase model pressure.

Therefore, when the breather hose 140 is normal, the crankcase model pressure and the crankcase internal pressure measured by the crankcase pressure sensor 15 should be the same or similar. However, if the breather hose 140 is abnormal, a difference occurs between the crankcase internal pressure and the crankcase model pressure. Through this method, it may be determined whether the breather hose 140 is abnormal.

In the operation S100, if it is preliminarily determined that the breather hose 140 is abnormal, the controller 150 determines whether the boosting pressure by the compressor is equal to or greater than the set pressure (e.g., 1,100 hPa) and the open value of the accelerator pedal is equal to or greater than the set value (e.g., 10%) (an operation S110).

If the boosting pressure is equal to or greater than the set pressure and the open value of the accelerator pedal is equal to or greater than the set value, the controller 150 forms negative pressure in the crankcase 14 (an operation S120).

To form the negative pressure in the crankcase, the controller 150 blocks the throttle valve 41 and blocks the waste gate valve 99.

In this manner, when the throttle valve 41 is blocked and the waste gate valve 99 is blocked in a region in which the engine speed is high (i.e., an operation region in which the open value of the accelerator pedal is equal to or greater than the set value), the boosting pressure increases. As a result, the negative pressure is forcibly formed inside the crankcase 14.

In this manner, after forming negative pressure in the crankcase 14, the controller 150 calculates the crankcase model pressure based on the atmospheric pressure measured by the atmospheric pressure sensor 61 and the intake air flow rate measured by the flow sensor 63 (an operation S130). Also, the controller 150 accumulates the crankcase model pressure calculated at every set cycle and calculates the accumulated model pressure.

Also, the controller 150 receives the crankcase internal pressure measured by the crankcase pressure sensor 15 at every set period (e.g., 1 second) and accumulates the crankcase internal pressure received at every set period by the set number of times (e.g., 500 times) to calculate an accumulated measured pressure (an operation S140).

If the accumulated model pressure is greater than or equal to the set value, the controller 150 calculates the ratio R between the accumulated model pressure and the accumulated internal pressure of the crankcase 14 (an operation S150).

If the ratio of the accumulated model pressure and the accumulated measured pressure is equal to or greater than the set ratio (e.g., 0.75) (in an operation S160), the controller 150 may determine that the breather hose is normal (an operation S170).

On the contrary, if the ratio of the accumulated model pressure and the accumulated measured pressure is less than the set ratio (e.g., 0.75) (in the operation S160), the controller 150 may finally determine that the breather hose 140 is abnormal (e.g., the breather hose 140 is released or separated, etc.) in an operation S180.

When it is finally determined that the breather hose 140 is abnormal, the controller 150 may generate an alarm to the driver through the display unit 160 (an operation S190).

According to the apparatus and method for diagnosing a blow-by gas recirculation system according to an embodiment, whether the breather hose is abnormal may be determined through the ratio of the accumulated model pressure and the accumulated measured pressure.

Figure 6:
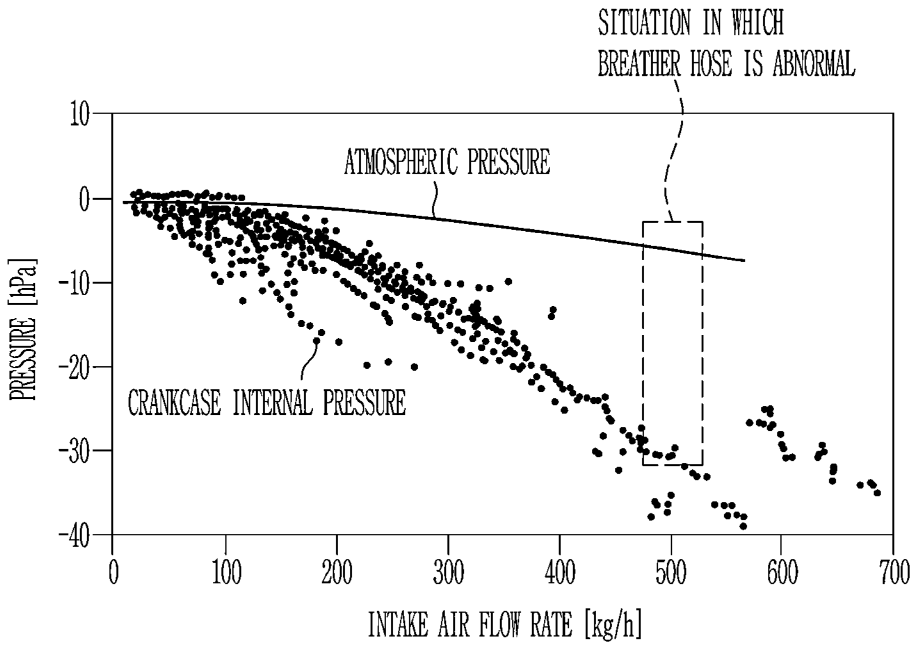
FIG. 6 is a graph illustrating the relationship between an intake air flow rate and crankcase internal pressure in a small engine.

Referring to FIG. 6, in the case of a small engine, a difference between the crankcase internal pressure in a normal state and the internal pressure of the crankcase that occurs when the breather hose 140 is abnormal, such as separation of the breather hose 140 or the like, is relatively large (e.g., 20 hPa). Therefore, whether the breather hose 140 is abnormal may be clearly determined through the ratio of the accumulated model pressure and the accumulated measured pressure.

Figure 7:
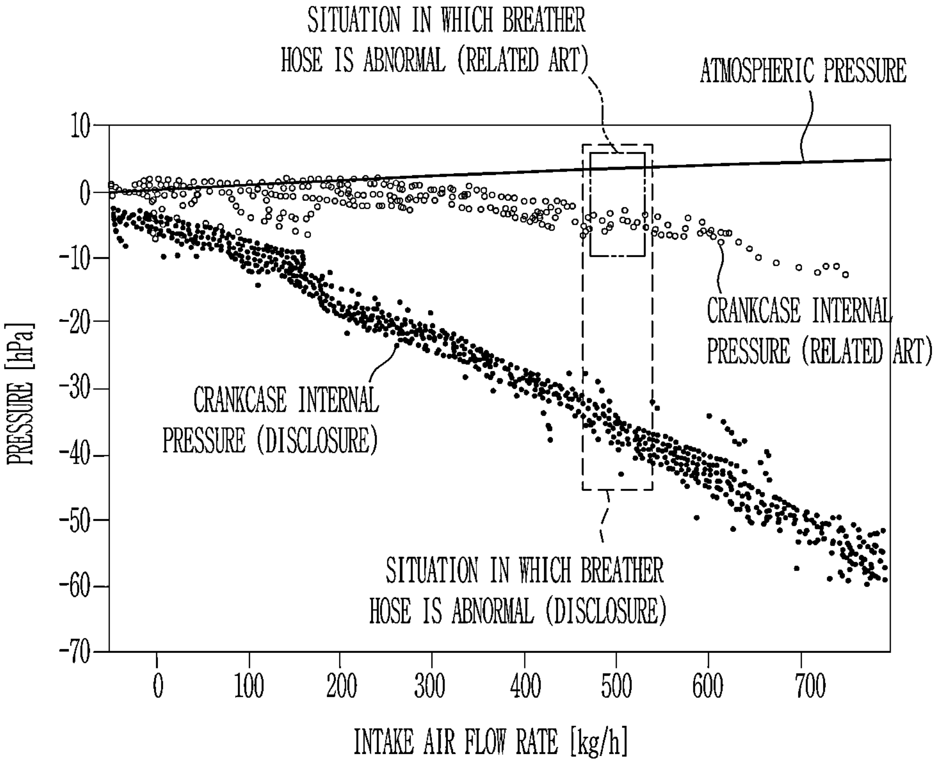
FIG. 7 is a graph illustrating the relationship between an intake air flow rate and crankcase internal pressure in a large engine.

Referring to FIG. 7, in the case of a large engine, a difference between the crankcase internal pressure in a normal state and the internal pressure of the crankcase that occurs when the breather hose 140 is abnormal, such as separation of the breather hose 140 or the like, is relatively small (e.g., 4 hPa). Therefore, it is difficult to clearly determine whether the breather hose 140 is abnormal based on the ratio of the accumulated model pressure and the accumulated measured pressure.

When the difference between a crankcase internal pressure in a normal state and an internal pressure of the crankcase that occurs when the breather hose 140 is abnormal, such as separation of the breather hose or the like, is relatively small, negative pressure is forcibly generated inside the crankcase according to an embodiment of the present disclosure and the difference between atmospheric pressure and the internal pressure of the crankcase 14 is increased, thereby clearly determining whether the breather hose 140 is abnormal.

Although the some embodiments of the present disclosure have been described above, the present disclosure is not limited thereto, and it is possible to carry out various modifications within the claim coverage, the description of the present disclosure, and the accompanying drawings, and such modifications also fall within the scope of the present disclosure.

DESCRIPTION OF SYMBOLS

10: combustion chamber
12: piston
14: crankcase
15: crankcase pressure sensor
17: speed sensor
18: accelerator pedal sensor
20: oil pan
30: head cover
40: intake manifold
41: throttle valve
43: throttle position sensor
50: exhaust manifold
60: intake line
61: atmospheric pressure sensor
63: flow sensor
70: surge tank
80: PCV hose
82: PCV valve
90: turbocharger
92: turbine
94: compressor
96: boosting pressure sensor
98: exhaust bypass line
99: waste gate valve
100: exhaust line
120: air cleaner
130: intercooler
140: breather hose
150: controller

What is claimed is:

1. An apparatus of diagnosing a blow-by gas recirculation system, the apparatus comprising:
- a head portion forming a combustion chamber of an engine;
- a head cover provided above the head portion;
- a crankcase formed below the combustion chamber;
- an intake line through which intake air flows into the combustion chamber;
- a breather hose connecting the crankcase and the intake line upstream of a compressor mounted on the intake line;
- a positive crankcase ventilation (PCV) hose connecting the crankcase and a surge tank; and
- a controller configured to:
  - preliminarily determine whether the breather hose is abnormal based on atmospheric pressure, a crankcase model pressure, and a crankcase internal pressure measured by a pressure sensor,
  - form negative pressure in the crankcase when it is preliminarily determined that the breather hose is abnormal, and
  - finally determine whether the breather hose is abnormal, wherein the crankcase model pressure is determined based on an intake air flow rate flowing in through a throttle valve.

2. The apparatus of claim 1, wherein the controller is configured to:
- accumulate the crankcase model pressure at every set period by a set number of times,
- accumulates the crankcase internal pressure measured by the pressure sensor to calculate an accumulated measured pressure, and
- calculates a ratio of the accumulated model pressure and the accumulated measured pressure to preliminarily determine whether the breather hose is abnormal.

3. The apparatus of claim 2, wherein the controller is configured to preliminarily determines that the breather hose is abnormal when the ratio of the accumulated model pressure and the accumulated measured value is less than a set ratio.

4. The apparatus of claim 3, wherein the controller is configured to:
- form negative pressure in the crankcase by blocking the throttle valve and blocking a waste gate valve,
- accumulate the crankcase model pressure at every set period by the set number of times to calculate the accumulated model pressure,
- accumulates the crankcase internal pressure measured by the pressure sensor to calculate the accumulated measured pressure, and
- calculate the ratio of the accumulated model pressure and the accumulated measured pressure to determine whether the breather hose is abnormal.

5. The apparatus of claim 4, wherein the controller is configured to make a final determination on an abnormality of the breather hose when the ratio of the accumulated model pressure and the accumulated measured value is less than the set ratio.

6. The apparatus of claim 4, wherein the controller is configured to block the throttle valve and the waste gate valve to form the negative pressure in the crankcase only when a boosting pressure by the compressor is equal to or greater than a set pressure and an open value of an accelerator pedal sensor is equal to or greater than a set value.

7. The apparatus of claim 1, wherein the crankcase model pressure is determined by a difference between atmospheric pressure and a pressure loss value due to an air cleaner determined from the intake air flow rate.

8. The apparatus of claim 7, wherein the pressure loss value associated with the intake air flow rate is stored in advance in the controller in a map data format.

9. A method of diagnosing a blow-by gas recirculation system, the method comprising:
- measuring, by a sensing unit, atmospheric pressure and an intake air flow rate of air flowing into a combustion chamber of an engine;
- calculating, by a controller, a crankcase model pressure based on the atmospheric pressure and a pressure loss associated with the intake air flow rate;
- preliminarily determining, by the controller, whether a breather hose of the engine is abnormal based on a crankcase internal pressure and a crankcase model pressure;

forming, by the controller, negative pressure in a crankcase of the engine when it is preliminarily determined that the breather hose is abnormal;

calculating, by the controller, the crankcase model pressure based on the atmospheric pressure and the pressure loss; and finally determining, by the controller, whether the breather hose is abnormal based on the crankcase internal pressure and the crankcase model pressure.

10. The method of claim 9, wherein the crankcase model pressure is determined by a difference between the atmospheric pressure and a pressure loss value due to the air cleaner determined from the intake air flow rate.

11. The method of claim 10, wherein the pressure loss value associated with the intake air flow rate is stored in advance in the controller in a map data format.

12. The method of claim 9, wherein the preliminarily determining includes:

accumulating the crankcase model pressure at every set period by a set number of times to calculate an accumulated model pressure;

accumulating the crankcase internal pressure at every set period by a set number of times to calculate an accumulated measured pressure; and calculating a ratio of the accumulated model pressure and the accumulated measured pressure to diagnose whether the breather hose is abnormal.

13. The method of claim 12, wherein it is preliminarily determined that the breather hose is abnormal when the ratio of the accumulated model pressure and the accumulated measured value is less than a set ratio.

14. The method of claim 9, wherein the finally determining includes:

accumulating the crankcase model pressure at every set period by a set number of times to calculate an accumulated model pressure;

accumulating the crankcase internal pressure at every set period by a set number of times to calculate an accumulated measured pressure; and calculating a ratio of the accumulated model pressure and the accumulated measured pressure to diagnose whether the breather hose is abnormal.

15. The method of claim 14, wherein it is finally determined that the breather hose is abnormal when the ratio of the accumulated model pressure and the accumulated measured value is less than a set ratio.

16. The method of claim 14, wherein the forming of the negative pressure is performed only when a boosting pressure by a compressor is equal to or greater than a set pressure and an open value of an accelerator pedal sensor is equal to or greater than a set value.

17. The method of claim 9, further comprising: diagnosing whether the breather hose is abnormal only when pressure of a compressor is equal to or higher than a set pressure and an open value of a throttle valve is equal to or greater than a set value.

* * * * *